US006714853B2

(12) United States Patent
Geyer et al.

(10) Patent No.: US 6,714,853 B2
(45) Date of Patent: Mar. 30, 2004

(54) METHOD OF OPERATING AN INTERNAL COMBUSTION ENGINE

(75) Inventors: Gerhard Geyer, Stuttgart (DE); Andreas Holl, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 10/188,593

(22) Filed: Jul. 3, 2002

(65) Prior Publication Data

US 2003/0023366 A1 Jan. 30, 2003

(30) Foreign Application Priority Data

Jul. 3, 2001 (DE) ........................................ 101 31 783

(51) Int. Cl.[7] ........................... F02M 47/00; G05D 1/00

(52) U.S. Cl. ....................................... 701/104; 123/447

(58) Field of Search ................................ 701/104, 105, 701/102; 123/447, 457, 445, 480, 446

(56) References Cited

U.S. PATENT DOCUMENTS 6,027,312 A * 2/2000 Djordjevic .................. 123/446

FOREIGN PATENT DOCUMENTS

| | | | |
|---|---|---|---|
| JP | 2002-98029 | * 4/2002 | .......... F02M/63/02 |
| JP | 2003-97379 | * 4/2003 | .......... F02M/47/00 |

* cited by examiner

*Primary Examiner*—Hieu T. Vo
(74) *Attorney, Agent, or Firm*—Kenyon & Kenyon

(57) ABSTRACT

A method of operating an internal combustion engine is provided for stabilizing the fuel pressure in a pressure accumulator, for example, when the quantity of fuel withdrawn from the pressure accumulator for injection rapidly changes.

8 Claims, 2 Drawing Sheets

METHOD OF OPERATING AN INTERNAL COMBUSTION ENGINE

FIELD OF THE INVENTION

The invention relates to a method of operating an internal combustion engine, in which a high-pressure pump pumps fuel into a pressure accumulator, a delivery quantity is supplied to the high-pressure pump using a metering unit, and an injected fuel quantity is withdrawn from the pressure accumulator and then injected. In addition, the invention relates to an internal combustion engine suitable for implementing this method.

BACKGROUND INFORMATION

A fuel delivery system, in which the fuel is delivered by a high-pressure pump into a pressure accumulator used to jointly supply a plurality of injectors, is referred to as a common-rail system.

The withdrawal of a quantity of fuel from the pressure accumulator used for injection (i.e., the injected fuel quantity) and/or leakage and control quantities of the injectors may result in a reduction of the fuel pressure in the pressure accumulator of a common-rail system.

The quantity of fuel identified as delivery quantity, which is supplied to a suction side of the high-pressure pump, should be distinguished from the injected fuel quantity. The delivery quantity is the injected fuel quantity plus the leakage and control quantities of the injectors.

Normally, a pressure control valve assigned to the pressure accumulator regulates the fuel pressure in the pressure accumulator of common-rail systems by returning a quantity of fuel to the fuel tank if the quantity of fuel exceeds a quantity required to attain or maintain the fuel pressure in the pressure accumulator.

In addition to pressure regulation by a pressure control valve, common-rail systems may regulate the quantity of the fuel supplied to the high-pressure pump.

In this connection, a metering unit may limit the delivery quantity supplied to the high-pressure pump to a value momentarily needed to maintain/attain a specified desired pressure in the pressure accumulator.

The suction side quantity regulation may avoid an unnecessary compression of surplus fuel by the high-pressure pump and a following decompression by the pressure control valve, which may contribute to a reduction of the power consumed by the fuel injection system, as wells as the temperature of the fuel in the system.

It is believed that a disadvantage of suction-side quantity regulation is that the system may be unable to optimally react to rapid changes in the injected fuel quantity, with respect to pressure regulation in the pressure accumulator.

Subsequent to a rapid change in the injected fuel quantity after a delay, the metering unit may deliver a delivery quantity adjusted to the new injected fuel quantity to the high-pressure pump, which may include multiple pistons.

However, a pump piston may have completed its suction stroke shortly before the change in the injected fuel quantity and thus may still been charged with an old delivery quantity corresponding to the old injected fuel quantity. This old delivery quantity may still be supplied to the pressure accumulator in the next discharge stroke of the pump piston.

The quantity difference between the old delivery quantity, which is still delivered into the pressure accumulator, and the new injected fuel quantity already withdrawn from the pressure accumulator may result in pressure changes in the pressure accumulator. It is believed that these pressure differences are directly related to the quantity difference.

If the injected fuel quantity abruptly increases, for example, if more fuel is withdrawn from the pressure accumulator by the immediate injection of the new, larger injected fuel quantity than is deliverable by the subsequent discharge stroke, which delivers only the old delivery quantity, the fuel pressure in the pressure accumulator may drop.

A sudden reduction in the injected fuel quantity may be more critical. Less fuel is withdrawn for injection from the pressure accumulator than is supplied to the pressure accumulator by a following piston stroke. This may result in a pressure rise in the pressure accumulator, which may reduce the service life of both the pressure accumulator and the high-pressure components connected to it.

SUMMARY OF THE INVENTION

An object of the present invention is to provide a method of operating an internal combustion engine, in which the fuel pressure in a pressure accumulator of the internal combustion engine is stabilized, to reduce the pressure load on components of the fuel delivery system.

In accordance with an exemplary embodiment of the present invention, an adjustment of the delivery quantity only effects the fuel pressure in the pressure accumulator when a first pump piston of the high-pressure pump is charged with the new delivery quantity in its suction stroke and this pump piston starts its discharge stroke into the pressure accumulator.

The time between the change in the injected fuel quantity and the first-time delivery of a new delivery quantity into the pressure accumulator is identified as dead time and is essentially a function of the time lag of the metering unit, the condition of the high-pressure pump at the time of the change in the injected fuel quantity, as well as the geometry of the high-pressure pump. In addition, the dead time is a function of the speed of the high-pressure pump in relation to the speed of the internal combustion engine.

An exemplary method of operating an internal combustion engine according to the present invention, in which a high-pressure pump pumps fuel into a pressure accumulator, a delivery quantity is supplied to the high-pressure pump using a metering unit and an injected fuel quantity is withdrawn from the pressure accumulator and injected, is characterized in that the delivery quantity is changed as a function of the new value of the injected fuel quantity as soon as a change in the injected fuel quantity from an old value to a new value is provided, the old injected fuel quantity continuing to be injected for a selectable delay time.

It is believed to be advantageous to establish a threshold value for the change in the injected fuel quantity and to change the delivery quantity only after it is exceeded.

In another exemplary method according to the present invention, the new injected fuel quantity is injected at the end of the above-described selectable delay time.

It is believed to be advantageous to select the delay time to at least roughly correspond to the dead time of the high-pressure pump.

The high-pressure pump may be mechanically driven, for example, by the internal combustion engine, a gear unit being interconnected to adjust the speed, depending on the type of internal combustion engine.

When driven by the internal combustion engine, the dead time of the high-pressure pump may be related to a crankshaft angle of the internal combustion engine, using the gear ratio between the high-pressure pump and the engine, as well as the number of pump pistons. The number of cylinders may be used to relate the dead time to the number of injections, which may be useful in specifying the delay time, since the internal combustion engine's dependence on the speed is eliminated.

The proportion of one pump stroke to supplying the injectors is determined by the number of cylinders and the gear ratio. The proportion of the fuel required for the next injection, which is located in the pump cylinder, may thus be known. As a function of these two parameters, the delay time or the number of injections corresponding to the delay time may be defined.

Furthermore, the delay time may be selected as a function of the operating state and/or the load of the internal combustion engine.

The high-pressure pump may be driven by a drive that is separate from the internal combustion engine, both the speed of the high-pressure pump and the speed of the internal combustion engine having to be considered in determining the delay time.

Injecting the old injected fuel quantity during the delay time withdraws the quantity of fuel from the pressure accumulator, which is delivered to the pressure accumulator by those pistons of the high-pressure pump that have completed their suction stroke before the change in the injected fuel quantity. Thus, these pistons deliver an old delivery quantity into the pressure accumulator that corresponds to the old injected fuel quantity.

In this manner, the fuel pressure in the pressure accumulator is stabilized, even when injected fuel quantities abruptly change, for example, as the result of abrupt changes in pedal travel when changing gears.

For example, a pressure increase in the pressure accumulator may be avoided when the injected fuel quantity is reduced as a result of a quantity of fuel corresponding to the old injected fuel quantity being delivered to the pressure accumulator during the dead time of the pump, while, however, only the reduced, new injected fuel quantity is withdrawn from the pressure accumulator. The pressure load on the high-pressure pump, the pressure accumulator, and additional components of the fuel injection system may thus be reduced and their service life may be increased.

Moreover, an exemplary method according to the present invention may avoid a reduction in pressure in the pressure accumulator, if a greater injected fuel quantity is to be injected. It is believed that the reduction in pressure results from more fuel being withdrawn from the pressure accumulator by injection than it is possible for the high-pressure pump to deliver to the pressure accumulator during its dead time.

According to an exemplary embodiment of the present invention, the retention of the quantity of fuel injected before the change in the injected fuel quantity for a selectable delay time may permit the fuel pressure in the pressure accumulator to remain constant, until a quantity of fuel that corresponds to the new injected fuel quantity may be delivered.

It is believed that an additional advantage of an exemplary method according to the present invention is that the response time to changes in the injected fuel quantity and a resulting adjustment of the delivery quantity is very short compared to other methods based, for example, on the filtering of quantity signals.

Since an exemplary method according to the present invention already considers the dead time of the high-pressure pump, processing in the pressure regulator may be superfluous.

It is believed that another advantage of an exemplary method according to the present invention is the low amount of calculation believed to be required, since only old and already determined values should be retained for the injected fuel quantity.

Selecting the delay time as a function of the speed of the internal combustion engine, as described above, may allow the selection of a delay time>0, if the speed of the internal combustion engine exceeds a specified minimum.

An exemplary method according to the present invention may be implemented as a computer program provided for a control unit of an internal combustion engine, for example, an internal combustion engine of a motor vehicle. In this regard, the computer program may execute on a microprocessor, thereby implementing an exemplary method according to the present invention. The computer program may be stored, for example, in an electric memory medium, for example, a flash memory or a read-only memory.

DETAILED DESCRIPTION

Figure 1:
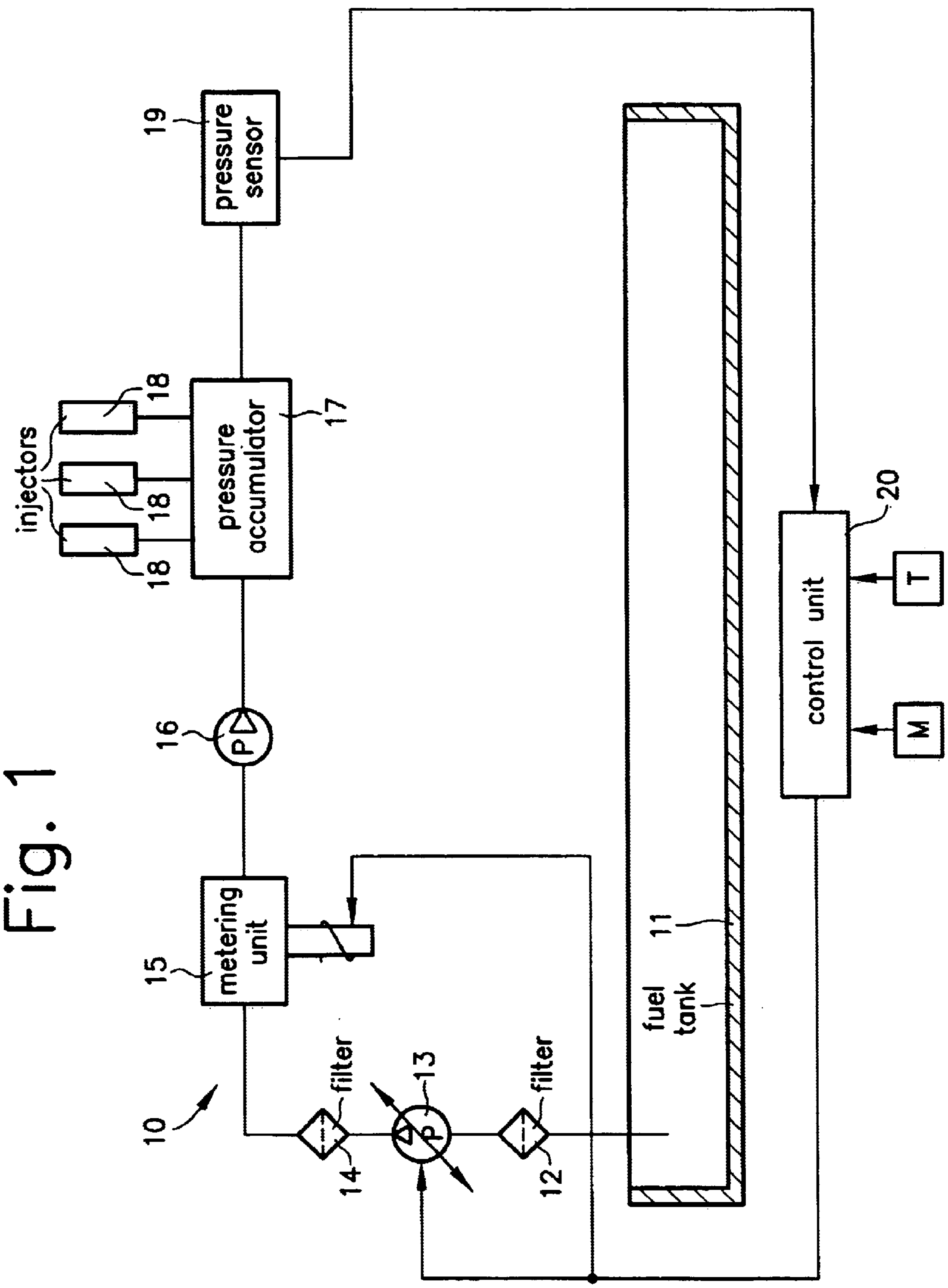
FIG. 1 is a block diagram of an exemplary potion of an internal combustion engine of a motor vehicle according to the present invention.

FIG. 1 shows a fuel delivery system 10 (i.e., a common-rail system) of an internal combustion engine. Fuel delivery system 10 is suitable for directly injecting fuel into the combustion chambers of the internal combustion engine under high pressure.

A presupply pump 13 draws the fuel from a fuel tank 11 via a first filter 12. Presupply pump 13 may be a gear pump or, for example, may be an electric fuel pump.

The fuel drawn by presupply pump 13 is delivered to a metering unit 15 via a second filter 14. Metering unit 15 may be, for example, a magnetically controlled proportional valve.

Metering unit 15 is arranged downstream from a high-pressure pump 16. A mechanical pump may be used as high-pressure pump 16, which may be driven directly by the internal combustion engine and/or via a gear unit.

High-pressure pump 16 is connected to a pressure accumulator 17 (i.e., a rail). The pressure accumulator 17 communicates with injectors 18 via fuel lines. The fuel is injected into the combustion chambers of the internal combustion engine via these injectors 18.

A pressure sensor 19 is coupled to pressure accumulator 17.

A control unit 20 receives a number of input signals. These input signals may include, for example, accelerator position M, the speed of the internal combustion engine, and/or the pressure within pressure accumulator 17, which may be measured by pressure sensor 19.

As a function of the input signals, control unit 20 generates a number of output signals, which may include, for example, a signal to actuate presupply pump 13 in the case of an electric presupply pump and/or a signal to actuate metering unit 15.

Operation of fuel delivery system 10 of FIG. 1 is described below.

The fuel located in fuel tank 11 is drawn by presupply pump 13 and delivered to metering unit 15. The pressure in this region of fuel delivery system 10 may range from roughly 5 bar to 7 bar in systems with a presupply pump 13 designed as a gear pump. This region may therefore be referred to as a low-pressure region.

A quantity of fuel identified as a delivery quantity is transferred from metering unit 15 to high-pressure pump 16, which delivery quantity—subject to the condition of a stationary operating state of the internal combustion engine—is to be injected into the combustion chambers of the internal combustion engine via injectors 18.

High-pressure pump 16 then delivers the fuel to be injected to pressure accumulator 17, so that it may be injected into the respective combustion chambers of the internal combustion engine via injectors 18 (the quantity of fuel actually injected into the combustion chambers is identified as injected fuel quantity).

The fuel pressure in pressure accumulator 17 may be influenced in at least two ways. A withdrawal of fuel by injection into the combustion chambers of the internal combustion engine reduces the pressure in pressure accumulator 17. A pressure increase in pressure accumulator 17 results as a function of the delivery quantity, which is pumped into pressure accumulator 17 by high-pressure pump 16.

High-pressure pump 16 is a radial piston pump and may include, for example, three pump pistons. As described above, the delivery quantity determined by metering unit 15 is delivered to the pump piston during a suction stroke of a pump piston and pumped under high pressure into pressure accumulator 17, in the subsequent discharge stroke of the pump piston.

The discharge and suction strokes of the pump pistons are staggered in time, so that, for example, a first piston may start its suction stroke, while a second piston completes its discharge stroke.

Figure 2:
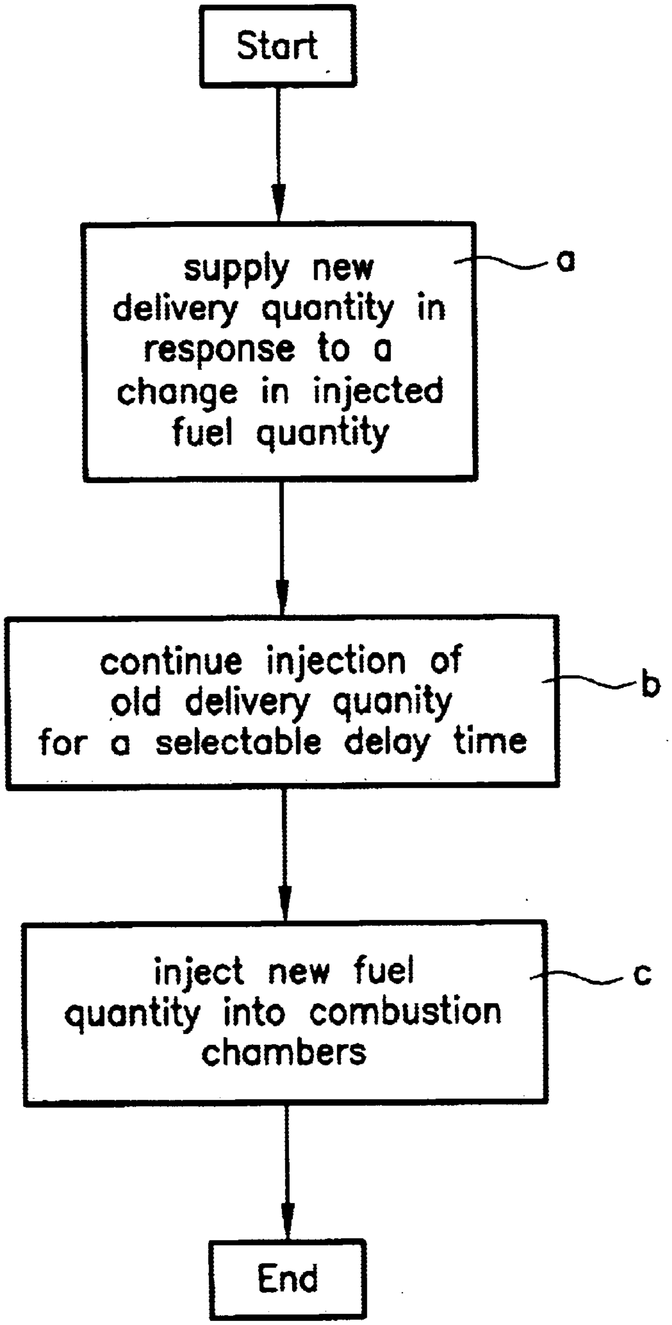
FIG. 2 is a flow diagram of an exemplary method according to the present invention.

As soon as a change in the injected fuel quantity is provided, which may result in a pressure change in pressure accumulator 17, a new delivery quantity is immediately supplied to the first piston for its suction stroke by metering unit 15 to react to the pressure change, as shown in step (a) of FIG. 2.

However, the second piston, which is in its discharge stroke, should first complete the discharge stroke with the old delivery quantity, to be charged with a new delivery quantity in its next suction stroke.

Since injectors 18 may inject a new injected fuel quantity into the combustion chambers without delay, high-pressure pump 16 may deliver a correspondingly adjusted delivery quantity into pressure accumulator 17 after a specific dead time, the old injected fuel quantity continuing to be injected for a selectable delay time, as shown in step (b) of FIG. 2. The delay time should be selected to be at least roughly equal to the dead time of high-pressure pump 16.

This ensures, or at least makes more probable, that, as a result of the injection by injectors 18, the same quantity of fuel is withdrawn from pressure accumulator 17 that is supplied to it during the dead time of high-pressure pump 16, so that the fuel pressure in pressure accumulator 17, during the dead time of high-pressure pump 16, remains nearly constant.

The dead time of high-pressure pump 16 may be calculated to determine the delay time. The delay time may be selected, for example, as a function of the speed or the load of the internal combustion engine, so that it does not interfere with special operating modes, for example, start and/or idle modes of the internal combustion engine.

The delay time may be specified as a multiple of the time between two injections, to eliminate the speed dependence of the delay time.

At the end of the delay time, i.e., as soon as the first piston of the high-pressure pump starts its discharge stroke with the new delivery quantity, the new injected fuel quantity is injected into the combustion chambers of the internal combustion engine, as shown in step (c) of FIG. 2.

Compared to other methods, an exemplary method according to the present invention, as described above, may not be audible.

What is claimed is:

1. An internal combustion engine for a motor vehicle, the internal combustion engine comprising:

i) a metering unit for supplying a delivery quantity to a high-pressure pump;

ii) means for withdrawing an injection fuel quantity from a pressure accumulator; and iii) an injector for injecting the injection fuel quantity;

wherein the delivery quantity is immediately changed when the injection fuel quantity changes from an old value to a new value, the delivery quantity being changed as a function of the new value, and the old value of the injection fuel quantity continuing to be injected for a selectable delay time.

2. A control unit for an internal combustion engine of a motor vehicle, the internal combustion engine having a high-pressure pump operable to pump fuel into a pressure accumulator, and a metering unit, the control unit comprising:

an arrangement operable to control the following steps:

i) supplying a delivery quantity to the high-pressure pump using the metering unit;

ii) withdrawing an injection fuel quantity from the pressure accumulator; and iii) injecting the injection fuel quantity;

wherein the delivery quantity is immediately changed when the injection fuel quantity changes from an old value to a new value, the delivery quantity being changed as a function of the new value, and the old value of the injection fuel quantity continuing to be injected for a selectable delay time.

3. A computer-readable medium storing a plurality of instruction sets for a control unit of an internal combustion engine of a motor vehicle, the internal combustion engine having a high-pressure pump, a pressure accumulator and a metering unit, the high-pressure pump pumping fuel into the pressure accumulator, the plurality of instruction sets comprising:

i) an instruction set for controlling supplying a delivery quantity to the high-pressure pump using the metering unit;

ii) an instruction set for withdrawing an injection fuel quantity from the pressure accumulator; and iii) injecting the injection fuel quantity;

wherein the delivery quantity is immediately changed when the injection fuel quantity changes from an old value to a new value, the delivery quantity being changed as a function of the new value, and the old value of the injection fuel quantity continuing to be injected for a selectable delay time.

4. The computer-readable medium according to claim 3, wherein the medium is one of an electric memory medium, a flash memory, and a read-only memory.

5. A method of operating an internal combustion engine having a high-pressure pump, a pressure accumulator and a metering unit, the method comprising the steps of:

supplying a delivery quantity to the high-pressure pump using the metering unit;

pumping fuel into the pressure accumulator using the high-pressure pump;

withdrawing an injection fuel quantity from the pressure accumulator; and injecting the injection fuel quantity;

wherein the delivery quantity is immediately changed when the injection fuel quantity changes from an old value to a new value, the delivery quantity being changed as a function of the new value, and the old value of the injection fuel quantity continuing to be injected for a selectable delay time.

6. The method according to claim 5, wherein the new value of the injection fuel quantity is injected only at the end of the selectable delay time.

7. The method according to claim 5, wherein the selectable delay time is selected as a function of a number of cylinders of the internal combustion engine and a gear ratio between the high-pressure pump and the internal combustion engine.

8. The method according to claim 5, wherein the selectable delay time is selected as a function of at least one of an operating state of the internal combustion engine, a speed of the internal combustion engine, and a load.

* * * * *